March 25, 1952 — E. D. DAHLMAN — 2,590,758
MACHINE FOR HANDLING POTATO VINES
Filed April 7, 1948 — 2 SHEETS—SHEET 1

Inventor
Eben D. Dahlmann
By Chas. C. Reiff
Attorney

March 25, 1952 E. D. DAHLMAN 2,590,758
MACHINE FOR HANDLING POTATO VINES
Filed April 7, 1948 2 SHEETS—SHEET 2
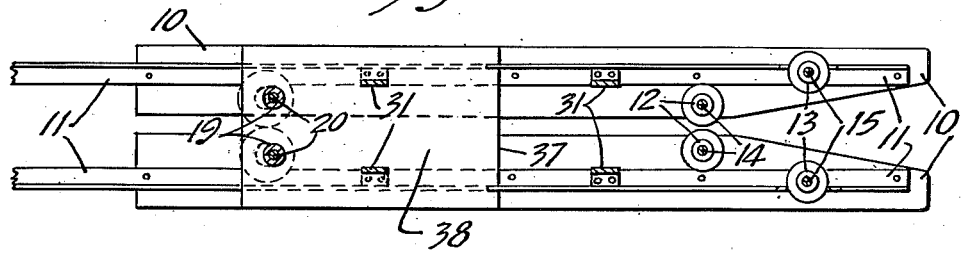
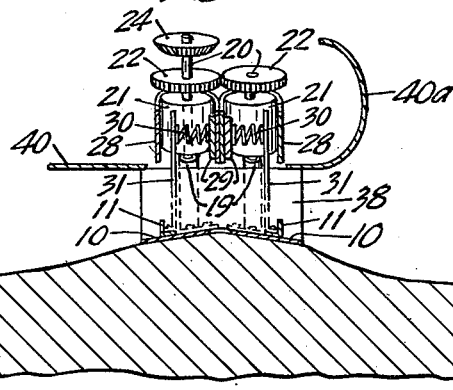
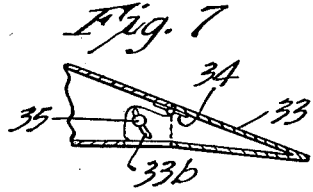
Inventor
Eben D. Dahlmann
By Chas. C. Reif
Attorney Patented Mar. 25, 1952

2,590,758

UNITED STATES PATENT OFFICE 2,590,758

MACHINE FOR HANDLING POTATO VINES

Eben D. Dahlman, Grandy, Minn.

Application April 7, 1948, Serial No. 19,518

2 Claims. (Cl. 55—66)

This invention relates to a machine for operating on and handling vines of certain plants, such as potato vines. In harvesting potatoes it has previously been a common practice to lift the potatoes and vines by means of a potato digger, the digger frequently delivering to a potato picker which elevated the vines and potatoes. It has been found to be a difficult task to properly separate and handle the vines. At the time the potatoes are dug the vines are usually present and these are often quite large, strong and tough. When these vines are lifted and passed to the picker and elevating mechanism, they tend to clog the machine, interfere with the operation thereof and interfere with any pickers who may be trying to separate the potatoes from the vines and other foreign matter.

It is an object of this invention to provide a simple and efficient device which may be used in the potato patch or field to remove the vines and dispose of the same before the potatoes are lifted or harvested.

It is a further object of the invention to provide such a machine having means adapted to travel at either side of the row of vines, preferably some distance below the surface of the ground, the adjacent sides of said members converging so as to guide the vines or move the same into a smaller space together with the pair of endless belts which receive said vines and move the same rearwardly.

It is another object of the invention to provide such a machine as set forth in the preceding paragraph in which the front ends of the belts diverge so as to facilitate the entry of the vines therebetween, said belts also preferably moving in an upwardly and rearwardly inclined direction.

It is also an object of this invention to provide a machine for handling vines comprising vine-lifting means, means for engaging the vines and moving them upwardly and rearwardly, said latter means moving over an upwardly and rearwardly inclined plate which merges with the platform to which the vines are delivered.

These and other objects and advantages of the invention will be fully set forth in the following description made in connection with the accompanying drawings in which like reference characters refer to the same parts throughout the different views and in which—

Fig. 3 is a horizontal section taken substantially on line 3—3 of Fig. 2, as indicated by the arrows;

Fig. 4 is a vertical section taken on line 4—4 of Fig. 1, as indicated by the arrows;

Fig. 5 is a vertical section through one side or run of a belt used;

Fig. 6 is a view similar to Fig. 5 showing a modification; and

Fig. 7 is a vertical section taken on line 7—7 of Fig. 1, as indicated by the arrow.

Figure 1:
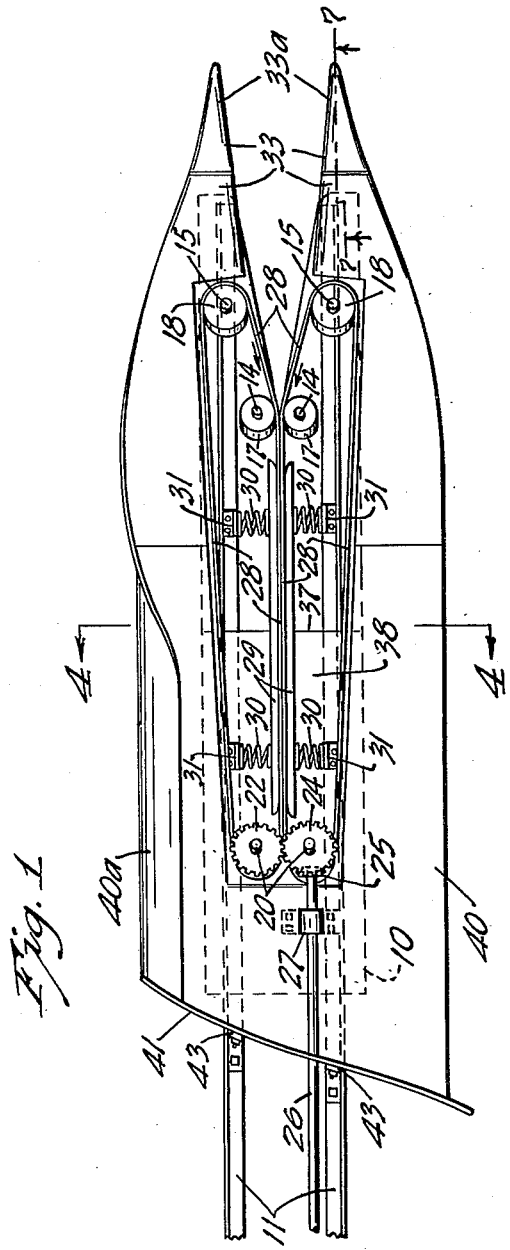
Fig. 1 is a plan view of the machine.
Figure 2:
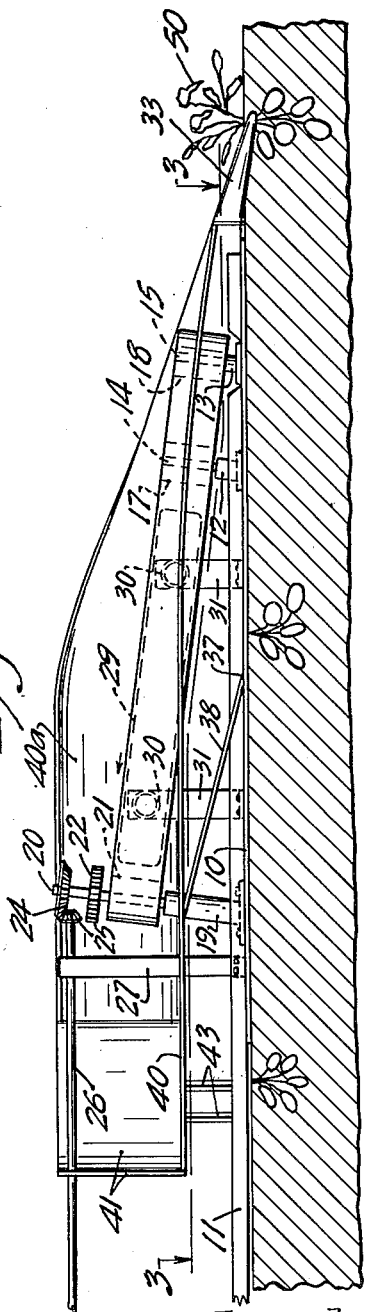
Fig. 2 is a view in side elevation.

Referring to the drawings, a machine is shown comprising a frame having ground-engaging means for supporting the machine. While these ground-engaging means might take various forms, in the embodiment of the invention illustrated they are shown as a plate 10 which extends longitudinally and centrally of the machine and has forward portions in laterally spaced relation and are of substantially rectangular form for the greater part of their length and having diverging edges at their front end portions so that said latter portions are trapezoidal. Plate 10 has secured thereto adjacent its outer sides respectively and extending longitudinally thereof members or angle bars 11 having the vertical flanges thereof at their remote sides. Secured to the plates 10 respectively, adjacent their forward ends, are brackets 12 and 13 which are longitudinally spaced. Brackets 12 and 13 have bottom flanges which are secured to plates 10 in any suitable manner, as by welding or riveting, and said brackets have upwardly extending cylindrical portions in which are secured shafts 14 and 15 respectively. Rollers 17 and 18 are journaled respectively on the shafts 14 and 15. Similar brackets 19 are secured adjacent the rear ends of plates 10 respectively, likewise having flanges secured to plates 10 in any suitable manner. Brackets 19 have upwardly extending portions shown as cylindrical in form and these have journaled therein shafts 20 respectively on which are secured rollers 21. Shafts 20 extend upwardly above rollers 21 and are provided adjacent said rollers with meshing gears 22. Some distance above gear 22 a bevel gear 24 is secured to one of the shafts 20 which meshes with a bevel pinion 25. Pinion 25 is secured to one end of a shaft 26 which extends rearwardly of the machine and is connected to a suitable source of power on the device which pushes the machine. A standard 27 is secured to plate 10 and to one of the angle bars 11 and has at its upper end a bearing for shaft 26. Belts 28 of endless form run over the rollers 17, 18 and 21, which belts have their sides in substantially vertical planes. Said belts are made of strong flexible material and, as shown in Fig. 2, these belts are of considerable width in a vertical direction. As shown in Fig. 1, the shafts 15 are spaced a considerably greater distance than the shafts 14 and the front end portions of the adjacent sides of belts 28 thus diverge forwardly. The adjacent sides of the belts between rollers 17 and 21 are parallel and in close proximity. Preferably plates 29 are disposed at the outer sides of the adjacent runs of belts 28, the same being in contact with said runs and said plates are moved against said belts by compression coiled springs 30 adjacent the front and rear ends of plates 29, which springs at their adjacent ends engage the plates 29 and at their outer ends engage and are secured in any suitable manner to upstanding plates 31 which are secured at their lower ends to angle bars 11. From the above description it is seen that bevel gear 24 is driven by pinion 25 which rotates one of the shafts 20 and the other shaft 20 is then rotated by the gear 22 secured thereto. This causes movement of the belts 28 and this movement is such as indicated by the arrows in Fig. 1 as to move the adjacent runs of the belts rearwardly.

Members 33 are provided which extend longitudinally of the machine and extend some distance forwardly of the belts 28 and plates 10, the same having substantially pointed ends and which flare rearwardly from said ends. The adjacent sides of members 33 converge and extend to points substantially aligned with the front ends of the parallel portions of belts 28. As shown in Figs. 1 and 2, the members 33 are somewhat flattened so that they are of greater dimension transversely than vertically. The end portions 33a of members 33 incline downwardly to a short distance below the plate 10 so that they move beneath the surface of the ground. The portions 33a are substantially in the form of flattened cones. Each portion 33a is hingedly connected to the portions in the rear thereof by a simple hinge 34 and portion 33a has a flange moving along the adjacent sides of the rear portion of member 33, which flanges have slots 33b therein through which pass respectively headed and nutted bolts 35 extending through the sides of the rear portions. Portions 33a can thus be moved to vary their downward inclination. The members 33 are of frusto-conical form in the rear of portions 33a as far rearward as a short distance in front of shafts 15 as shown in Fig. 1. Members 33 are then cut away at their adjacent sides to accommodate belts 28. From the point indicated as 37 in Fig. 2, the space between the longitudinal edges of the forward portion of member 10 and 33 are closed by an upwardly and rearwardly inclining plate 38. Plate 38 extends upwardly to and merges with a plate 40 forming a platform at the rear of belts 28 which extends in a substantially horizontal plane at the right hand side of the machine, as shown in Figs. 1, 2 and 4, but which is curved upwardly in a rather large reverse bend at the left hand side of the machine. The outer portions of members 33 also extend upwardly and rearwardly and merge with the platform 40 some distance forwardly of plate 38. A rear plate 41 extends substantially vertically along the rear side of platform 40 and projects a short distance beyond the same, as shown in Fig. 1. Extensions 11a in the form of angle bars are secured to the ends of members 11 and to rear plate 41 by suitable connecting brackets 42. Said extensions 11a will extend rearwardly to the propelling vehicle. Platform 40 is supported adjacent its rear end by uprights 43 engaging the bottom thereof and secured at the lower ends to angle bars 11.

In operation the machine is propelled forwardly by tractor, truck or other suitable vehicle and is pushed by members 11a. Shaft 26 is rotated from a power source on said propelling vehicle. The machine moves along the row of vines with members 33a disposed at either side of said row. As members 33a move forwardly beneath the surface of the ground, the vine 50 is engaged and the branches or parts thereof are lifted and engaged by the adjacent sides of portions 33a. As the machine moves forwardly the parts of the vine are brought together by the converging sides of members 33. The forward portions of plate 10 also move along the sides of the vines. As the vines reach the point between members 33 and the spaced forward portions of plate 10 below the belts 28, they are engaged by the rearwardly moving sides of belts 28 and when they come between the rollers 17 they are firmly gripped by the belts and carried rearwardly and upwardly. As the vines move upwardly they are pulled upwardly through the narrow space between the portions of plate 10 so that any potatoes on the vines are separated therefrom. The vines are carried upwardly on plate 38 and by this time they are severed from the potatoes and slide upwardly on plate 38 and are carried rearwardly and discharged on platform 40. The vines are deflected to the right side of the platform 40 by the curved formation 40a at its left hand side and are crowded off of the platform on the right hand side. The vines are thus discharged at the right hand side of the machine and, if necessary, this discharge can be aided by an operator.

In Fig. 6 a different form of belt is shown in which a heavy canvas 40b has riveted thereto at intervals semi-cylindrical or segmental cleats 40c. With this form of belt the vines are firmly gripped between the adjacent sides of the belt and the cleats 40c.

From the above description it is seen that I have provided a comparatively simple and yet highly efficient machine for handling the potato vines. As above stated the vines have heretofore been very difficult to handle and have constituted quite a problem. After the present machine is moved from the field, the vines are out of the way and the potatoes can be readily lifted by the usual digger and cleaned and packed with great speed and efficiency. It is obvious that the device will have a high degree of utility for the purposes intended.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A machine for lifting and conveying potato vines having in combination, a pair of spaced forwardly directed substantially conical members having their adjacent sides converging and having their front ends adapted to enter the ground at the sides respectively of the vines and their rear ends above the ground and their front ends slightly below the surface of the ground and well above the potatoes, ground-engaging means for supporting said machine and members, a pair of comparatively wide endless belts having adjacent sides moving rearwardly, said sides having forward portions of considerable length disposed in rearwardly converging vertical planes having the rear portions in close proximity and adjacent said ground-engaging means for gripping and moving said vines upwardly and rearwardly, said machine having a platform in the rear of said belts for receiving said vines, and a plate extending downwardly and forwardly from said platform longitudinally and centrally of said machine and beneath the adjacent sides of said belts, said plate extending to adjacent the ground whereby vines will be carried upwardly along said plate.

2. A vine pulling and handling machine having in combination, spaced members arranged to move at each side of said vines for lifting the same, said members having their adjacent sides converging and their forward ends moving adjacent the surface of the ground well above the potatoes, a pair of comparatively wide endless belts having their runs in substantially vertical planes and their adjacent runs moving rearwardly from points adjacent said members whereby said vines will be directed between said adjacent runs by said members, said adjacent runs being in close proximity at their rear portions and having front flat portions of considerable extent converging rearwardly to said rear portions in substantially vertical planes so that said vines are gripped therebetween and carried rearwardly and upwardly, a plate having front spaced portions and moving in contact with the ground on which said members and belts are supported, said portions moving along the sides respectively of said vines, said belts at their forward ends being disposed adjacent said portions and an upwardly inclined plate extending between said portions intermediate the ends of said belts along which said vines are moved upwardly by said belts.

EBEN D. DAHLMAN.

REFERENCES CITED

The following references are of record in the file of this patent:

UNITED STATES PATENTS

| Number | Name | Date |
| --- | --- | --- |
| 798,305 | Smith | Aug. 29, 1905 |
| 848,089 | Dotson | Mar. 26, 1907 |
| 1,459,060 | Kreipe | June 19, 1923 |
| 2,083,128 | Sparks | June 8, 1937 |
| 2,124,309 | Munsterman | July 19, 1938 |
| 2,314,773 | Dahlman | Mar. 23, 1943 |
| 2,331,520 | Urschel | Oct. 12, 1943 |
| 2,476,336 | Urschel | July 19, 1949 |